Dec. 23, 1952     A. N. GRAY     2,622,469
METHOD OF AND APPARATUS FOR CONTROLLING
THE TEMPERATURE OF PLASTIC MATERIAL
Filed May 4, 1951
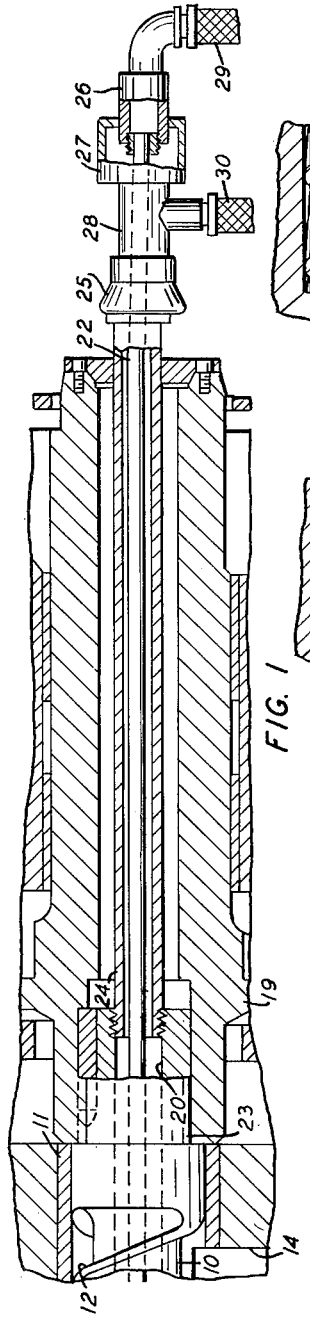
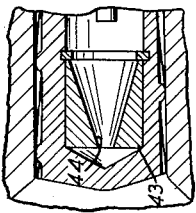
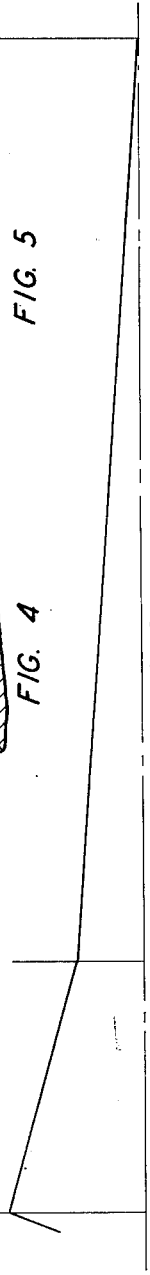
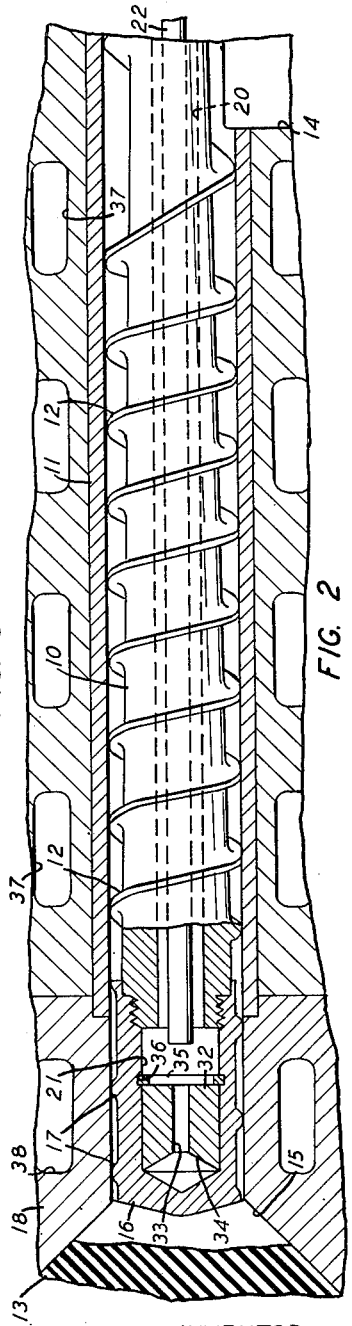
INVENTOR
A. N. GRAY
BY
ATTORNEY Patented Dec. 23, 1952

2,622,469

UNITED STATES PATENT OFFICE 2,622,469

METHOD OF AND APPARATUS FOR CONTROLLING THE TEMPERATURE OF PLASTIC MATERIAL

Alvin N. Gray, Edgewood, Md., assignor to Western Electric Company, Incorporated, New York, N. Y., a corporation of New York Application May 4, 1951, Serial No. 224,477

8 Claims. (Cl. 18—12)

This invention relates to methods of and apparatus for controlling the temperature of plastic material, and more particularly to methods of and apparatus for controlling the temperature of plastic material in the vicinity of a stock screw of an extruder.

In the art of extruding plastic materials, it has long been recognized that some means must be provided for controlling the temperatures in the interior of the extruder, in order to control the plasticity of the material being extruded. When a highly accelerated, vulcanizable, elastomer compound is being extruded, attention must be given to the problem of temperature control. If the means for providing such temperature control is inadequate, localized premature vulcanization of such elastomer compound may occur and clogging of the extruder may result. It is especially important to exert such temperature control when a thermoplastic compound, such as polyethylene or polyvinyl chloride, is being extruded, because the capacity of a stock screw to extrude such a thermoplastic compound may be critically affected by the temperature of the thermoplastic compound distributed therealong.

The old practice of providing annular channels for circulating a cooling fluid about the exterior of the extrusion bore, often has been conventionally adopted to provide a limited amount of temperature control. It has also been customary to provide the stock screw with an interior bore and to supply a cooling medium under pressure to a tube which is disposed longitudinally in spaced relationship to the interior bore. The procedures heretofore employed have been effective to prevent the stock screw from overheating at the delivery end thereof, and to provide a crude control of the temperature at various points along the exterior of the extrusion bore. However, the devices of the prior art have not provided a satisfactory means for accurately controlling the temperature gradient in the plastic material disposed along the stock screw, nor have these devices been capable of producing a temperature gradient ideally suited for the extrusion of plastic material.

An object of the invention is to provide new and improved methods of and apparatus for controlling the temperature of plastic material.

Another object of the invention is to provide new and improved methods of and apparatus for controlling the temperature of plastic material in the vicinity of a stock screw of an extruder.

A method illustrating certain features of the invention may include admitting a cooling medium under pressure into the chamber of a longitudinally chambered stock screw of an extruder, and circulating a predetermined minor portion of the cooling medium within one end of the chamber to maintain in the plastic material a predetermined temperature gradient therealong.

An apparatus illustrating certain features of the invention may include a stock screw having a longitudinal bore therein, means for admitting a cooling medium under pressure into the bore and means for circulating a predetermined minor portion of the cooling medium within one end of the bore to maintain a predetermined temperature in plastic material disposed along the stock screw.

A complete understanding of the invention may be obtained from the following detailed description of methods and apparatus forming specific embodiments thereof, when read in conjunction with the appended drawing, in which:

Fig. 1 is a horizontal, longitudinal, sectional view of the entrance end portion of a stock screw for an extruder, embodying certain features of the invention;

Fig. 2 is a continuation of the left hand end of Fig. 1, showing the advancing and delivery end portions of the stock screw;

Fig. 3 is a diagram of an ideal temperature gradient for plastic material disposed along the stock screw;

Fig. 4 is an enlarged sectional view of an alternative form of a flow regulator embodied in the invention, and Fig. 5 is an enlarged sectional view of another alternative form of the flow regulator.

Referring now in detail to the drawing, a stock screw 10 is disposed within an imperforate, cylindrical casing 11, and is provided with a flat-topped helical rib 12 for advancing plastic material 13 to the left, as viewed in Figs. 1 and 2, from an entrance hopper 14 to a delivery orifice 15. A die (not shown) is mounted in communication with the delivery orifice 15, and is designed to encase an advancing electrical conductor (not shown) with an insulating sheath of the plastic material.

As the plastic material is advanced from the entrance hopper 14 to the delivery orifice 15, the advancing material is kneaded with progressively increasing intensity due to the fact that the root of the stock screw 10 is tapered and gradually increases in diameter from one end to the other. The flat-topped helical rib 12 is equidistantly spaced closely to the wall of the cylindrical casing 11 throughout the length of the stock screw 10, so that the advancement of the plastic material may be uniformly controlled. Certain features of this type of stock screw are described and claimed in A. N. Gray Patent 2,547,000, issued April 3, 1951, for "Apparatus for Simultaneously Advancing and Plasticizing Plastic Compounds."

At the delivery end of the stock screw 10, the advancing material is given a severe working action by an extension 16, which is threadedly secured to the stock screw 10. The extension 16 is provided with a plurality of round-topped helical ribs 17—17, which are closely spaced from a surrounding imperforate, cylindrical casing 18, which is secured to and forms a continuation for the cylindrical casing 11 surrounding the stock screw 10. An extrusion apparatus embodying this type of extension is described and claimed in copending application Serial No. 86,085, filed April 7, 1949, by G. E. Gliss, for "Method of and Apparatus for Advancing and Working Plastic Compounds." Certain features of this type of stock screw extension in combination with a stock screw are described and claimed in copending application Serial No. 86,086, filed April 7, 1949, by G. E. Gliss and A. N. Gray, for "Method of and Apparatus for Working and Extruding Plastic Compounds into Article Form." The rotation of the stock screw 10 and its extension 16 is accomplished by means of an elongated gearing member 19, which is geared to a conventional driving means (not shown).

The temperature of the plastic material being advanced along the stock screw 10 and its extension 16 is controlled primarily by means located within the body of the stock screw and its extension. For this purpose, the stock screw 10 is provided with an interior cylindrical bore 20 and the extension 16 is provided with an interior chamber 21 through which a cooling medium may be circulated. An elongated tube 22, is disposed longitudinally in spaced relationship within the interior bore 20, and may protrude into the chamber 21 of the extension 16. A boss 23 is secured to the stock screw 10 at the entrance end thereof, and an extension tube 24 is threadedly secured to the boss 23 at one end thereof. The other end of the extension tube 24 extends beyond the extruder and is secured to a rotatable sealing coupling 25. The elongated tube 22 extends through the extension tube 24 and beyond the rotatable coupling 25 to a fixed coupling 26 having a housing 27. The fixed joint housing 27 is secured to the rotatable coupling 25 by a T-shaped pipe 28. A cooling medium, such as water, may be introduced under pressure through a pipe 29 to the fixed coupling 26, from whence the cooling medium may travel the length of the elongated tube 22 to the chamber 21, and return along the interior bore 20 outside the tube 22 to the T-shaped pipe 28, from whence the cooling medium may be discharged through a pipe 30.

Disposed within the chamber 21 near the delivery end portion of the extension 16 is a flow regulator 32. This regulator is in the form of a cylindrical plug, and is provided with an axial bore 33 communicating with a bellmouthed portion 34. The regulator 32 may be secured at this end of the chamber 21 by any suitable means, such as a snap-ring 35 fitted within an annular groove 36 in the wall of the chamber 21.

The regulator 32 must fit snugly within the chamber 21, since any interfacial separation between the exterior wall of the regulator 32 and the wall of the chamber 21 will interfere with the transfer of heat between these members. The regulator may be formed of a malleable metal, such as lead. If desired, a previously formed lead plug of the proper configuration may be spiked, i. e. force-fitted, into the chamber 21, instead of being secured by the snap-ring 35.

An auxiliary means may be provided exterior of the stock screw 10 and its extension 16 for controlling the temperature of the advancing plastic material. Such means may include a plurality of annular channels 37—37 surrounding the cylindrical casing 11 and an annular channel 38 within the cylindrical casing 18. A hot or a cold fluid, as desired may be circulated through the annular channels 37—37 and 38.

The relative temperatures of the plastic material at successive points along its path of travel while being advanced by the stock screw 10 and the extension 16, may be illustrated by a curve similar to the one shown diagrammatically in Fig. 3. The temperature gradient shows a gradual rise from about room temperature at the entrance end portion of the stock screw to the delivery end portion of the stock screw 10, and then rises at a somewhat greater slope to the delivery end portion of the extension 16, at which point the temperature drops rather abruptly. This gradient represents ideal temperature conditions prevailing as a result of proper functioning of the temperature controlling system.

As the plastic material is advanced and kneaded by the stock screw 10, and then given a vigorous working treatment by the extension 16, a considerable amount of heat is generated in the plastic material. It is the function of the temperature controlling system to dissipate this heat, and to control the dissipation of the heat at various stages of the advancing and working process, so that the temperature conditions prevailing in the plastic material disposed along the extruder will appear as is represented in Fig. 3. The clearance between the ribs 17—17 of the extension 16 and the surrounding wall of the casing 18 is so small, and the helix angle of the ribs 17—17 is such, that the greatest amount of heat is generated during the exceedingly vigorous working action which occurs at this stage. While a high temperature is necessary in order to assist this kneading action, and to aid in causing the long molecules of a vulcanizable elastomer compound to break down, the temperature must not be too high at this point lest scorching of the compound occur.

In the case of a thermoplastic compound, the material may become so fluid, if not controlled, that the helical ribs would be unable to exert an advancing action thereon. By discharging the cooling medium from the tube 22 into the chamber 21, the greatest cooling effect is obtained in this area.

In processing a thermoplastic compound, the delivery characteristics of an extrusion screw may be materially affected by the temperature of the compound in the pusher section of the screw. The primary function of the stock screw 10 is to advance the plastic material, and the portion of the extrusion apparatus occupied by this stock screw 10 may be termed the pusher section, whereas the primary function of the extension 16 is to knead the plastic material, and this portion of the apparatus may be termed the plasticizing section. If a thermoplastic compound becomes overheated in the pusher section, the compound may become so fluid that the stock screw will be incapable of building up pressure in this section to advance the compound efficiently to force it through the plasticizing section of the extrusion apparatus.

This effect upon the delivery efficiency of an extruding screw may be strikingly illustrated during the extrusion of polyethylene. When an extrusion screw is delivering this thermoplastic compound to a die having a small orifice, so that a high pressure head is created at the delivery end of the screw, merely by increasing the temperature of the fluid circulating through the interior of the pusher section of the screw from about 76° F. to about 136° F., the delivery efficiency may be reduced as much as 50%.

The cylindrical regulator 32 exerts a throttling effect on the discharging cooling medium, so that only limited circulation of some of the cooling medium may occur in the bellmouthed portion 34 thereof. The circulation of a predetermined minor portion of the cooling medium between the end of the chamber 21 and the bellmouthed portion 34 of the regulator 32, is effective to cause the temperature of the plastic material which is being extruded at the delivery end portion of the stock screw extension 16 to drop abruptly, in the manner illustrated by the temperature gradient in Fig. 3. The temperature gradient along the extension 16, which constitutes the plasticizing section of the extruder, should show a gradual rise. In some instances, it may be desirable to change the slope of the temperature gradient along the extension 16. In such case, an alternative form of the regulator may be employed.

One alternative flow regulator 39 is shown in Fig. 4, and is provided with an axial bore 40 therein communicating with bellmouthed portions 41 and 42 on the opposite ends thereof.

A second alternative flow regulator 43 is illustrated in Fig. 5. This embodiment has an axial bore 44 therein which is tapered in the form of a cone.

It is evident that flow regulators having other configurations may be found to be suitable. The essential element is to permit a minor portion of the cooling fluid to travel through the regulator, and be circulated to a limited extent in the end of the chamber in the delivery end of the stock screw. The temperature gradient along the plasticizing section of the stock screw should rise gradually to the delivery end thereof and then drop abruptly. The different configurations of the flow regulators make it possible to change the slope of the temperature gradient along this section of the stock screw.

The methods and apparatus described herein may be effectively employed for different types of plastic materials, including vulcanizable elastomer compounds, such as, neoprene (polymerized chloroprene), Buna-S (a copolymer of butadiene and styrene) and natural rubber, and thermoplastics, such as, polyethylene and polyvinyl chloride. Since the plasticity and softening points of these compounds are different, the desirable extrusion temperature for each compound will be different.

However, the temperature gradient for each of these compounds should resemble the curve illustrated in Fig. 3, in which relative temperatures have been used.

The invention is not limited to the particular type of stock screw and extension illustrated herein, but may be applied to any type of extrusion screw. The problem of obtaining adequate heat exchange to satisfactorily control temperatures is ordinarily greatest in extrusion screws of large diameter, and the methods and apparatus embodying the invention are most useful in this instance.

What is claimed is:

1. The method of controlling the temperature of plastic material which is distributed along an extruding screw having an interior bore which is open at an entrance end portion of the screw and closed at a delivery end portion thereof, which comprises admitting a cooling medium under pressure into the portion of the interior bore near the delivery end portion of the screw, directing a predetermined minor portion of the cooling medium toward the closed end of the bore, and directing a predetermined major portion of the cooling medium toward the open end of the bore, so that a predetermined temperature gradient is maintained in the plastic material.

2. The method of maintaining a predetermined temperature gradient in a thermoplastic compound which is being advanced and kneaded by an extruding screw having an interior bore which is open at an entrance end portion of the screw and extends to a chamber in a delivery end portion of the screw, which comprises introducing a cooling fluid into the open end of the bore in the screw, flowing the cooling fluid along the bore to the chamber in the delivery end portion of the screw, circulating a predetermined minor portion of the fluid in the chamber, directing a predetermined major portion of the fluid toward the open end of the bore, and counterflowing all of the fluid along the bore from the chamber to the open end of the bore.

3. An apparatus for controlling the temperature of plastic material being advanced by an extruder, which comprises a stock screw having an interior bore which is open at an entrance end portion of the screw and closed at a delivery end portion of the screw, means for introducing a cooling medium into the bore through the open end thereof, means for circulating a predetermined minor portion of the cooling medium in the bore near the closed end thereof, and means for circulating the remaining and major portion of the cooling medium along the bore from the closed end to the open end thereof, so that a predetermined temperature gradient is maintained in the plastic material.

4. An apparatus for controlling the temperature of plastic material being advanced by an extruder, which comprises a stock screw having an interior bore which is closed at a delivery end portion of the screw having a chamber therein and is open at an entrance end portion thereof, means for introducing a cooling fluid into the bore through the open end thereof, means for flowing the cooling fluid along the bore to the chamber in the delivery end portion of the screw, means for circulating a predetermined minor portion of the cooling fluid in the chamber, means for directing the remaining and major portion of the cooling fluid toward the open end of the bore, and means for counterflowing all of the cooling fluid along the bore to the open end thereof, so that a predetermined temperature gradient is maintained in the plastic material.

5. An apparatus for maintaining a predetermined temperature gradient in plastic material which is being advanced and kneaded by an extruder, which comprises a stock screw having an interior bore extending from an entrance end portion of the screw to a chamber in a delivery end portion of the screw, an elongated tube disposed in spaced relationship within the bore from the entrance end thereof to the chamber at the other end thereof, means for admitting a cooling liquid under pressure into the tube at the open end of the bore, a cylindrical flow regulator snugly fitted within the chamber, said regulator having an axial bore for permitting limited circulation of the liquid therethrough, means for discharging the liquid from the open end of the bore, and means for rotating the stock screw.

6. An apparatus for maintaining a predetermined temperature gradient in a thermoplastic compound which is being advanced and kneaded by an extruder, which comprises a cylindrical casing, a stock screw disposed within the casing and having an interior bore extending from an entrance end portion of the screw to a chamber in a delivery end portion of the screw, means for rotating the stock screw within the casing to advance and knead thermoplastic compound therealong, an elongated tube disposed in spaced relationship within the bore from the entrance end thereof to the chamber at the other end thereof, means for admitting a cooling fluid under pressure into the tube at the open end of the bore, a cylindrical flow regulator snugly fitted within the chamber, said regulator having an axial bore communicating with a bellmouthed portion at an end thereof facing away from the tube for permitting limited circulation of the fluid therein, and means communicating with the bore exterior of the tube for discharging fluid therefrom.

7. An apparatus for maintaining a predetermined temperature gradient in a thermoplastic compound which is being advanced and kneaded by an extruder, which comprises a cylindrical casing, a stock screw disposed within the casing and having an interior bore extending from an entrance end portion of the screw to a chamber in a delivery end portion of the screw, means for rotating the stock screw within the casing to advance and knead thermoplastic compound therealong, an elongated tube disposed in spaced relationship within the bore from the entrance end thereof to the chamber at the other end thereof, means for admitting a cooling fluid under pressure into the tube at the open end of the bore, a cylindrical flow regulator secured within the chamber, said regulator having a conical axial bore facing towards the tube for providing a zone of limited fluid circulation in the end of the chamber near the delivery end portion of the stock screw, and means communicating with the bore exterior of the tube for discharging fluid therefrom.

8. An apparatus for maintaining a predetermined temperature gradient in a thermoplastic compound which is being advanced and kneaded by an extruder, which comprises a cylindrical casing, a stock screw disposed within the casing and having an interior bore extending from an extrance end portion of the screw to a chamber in a delivery end portion of the screw, means for rotating the stock screw within the casing to advance and knead thermoplastic compound therealong, an elongated tube disposed in spaced relationship within the bore from the entrance end thereof to the chamber at the other end thereof, means for admitting a cooling fluid under pressure into the tube at the open end of the bore, a cylindrical flow regualtor snugly fitted within the chamber, said regulator having an axial bore communicating with a bellmouthed portion at each end thereof for permitting limited circulation of the fluid therein, and means communicating with the bore exterior of the tube for discharging fluid therefrom.

ALVIN N. GRAY.

REFERENCES CITED

The following references are of record in the file of this patent:

UNITED STATES PATENTS

| Number | Name | Date |
|---|---|---|
| 1,092,451 | Pierce | Apr. 7, 1914 |
| 1,849,291 | Gordon | Mar. 15, 1932 |
| 2,319,859 | Hale | May 25, 1943 |